US006206140B1

(12) United States Patent
Craft et al.

(10) Patent No.: US 6,206,140 B1
(45) Date of Patent: Mar. 27, 2001

(54) PRESSURE LUBRICATION SYSTEM FOR COUNTERSHAFT TRANSMISSION

(75) Inventors: Robert B. Craft, Ceresco; Daniel A. Monette, Battle Creek, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/364,391

(22) Filed: Jul. 30, 1999

(51) Int. Cl.⁷ ........................................................ F01M 1/12
(52) U.S. Cl. ................................................ 184/8; 184/6.12
(58) Field of Search .......................... 184/8, 6.12

(56) References Cited

U.S. PATENT DOCUMENTS

| 3,105,395 | 10/1963 | Perkins | 74/745 |
| 3,237,472 | 3/1966 | Perkins et al. | 74/331 |
| 3,425,290 | 2/1969 | Perkins | 74/331 |
| 4,932,500 | * 6/1990 | Smith et al. | 184/5.1 |
| 5,319,920 | * 6/1994 | Taylor | 60/39.08 |
| 6,066,060 | * 5/2000 | Harper | 475/136 |

* cited by examiner

Primary Examiner—David Fenstermacher
(74) Attorney, Agent, or Firm—Rader, Fishman & Grauer PLLC

(57) ABSTRACT

A lubrication system for transmissions is provided wherein a lubrication flow path is provided from an oil pump located within a transmission casing to front countershaft bearings. A second flow path provides oil directly to a predetermined number of gear sets located along a main shaft. In one embodiment, oil flows through a first tube from the oil pump to an annular ring located in a groove between a front wall of the transmission main case and a rear face of a clutch housing. The ring is provided with a plurality of apertures along its outer circumference spaced to allow oil to flow directly to front bearings of any counter shaft placed adjacent the main shaft. A closed ended tube connects to the annular ring and extends perpendicularly from the annular ring through the front wall of the transmission main case. The closed ended tube extends substantially parallel to the driven main shaft, and includes spaced apertures that deliver oil directly to a predetermined number of gear sets located axially along the main shaft.

22 Claims, 5 Drawing Sheets

PRESSURE LUBRICATION SYSTEM FOR COUNTERSHAFT TRANSMISSION

RELATED APPLICATIONS

The subject matter of this application is related to Applicant's copending application entitled "Oil Filtration System And Adapter", application Ser. No. 09/364,966, filed concurrently herewith on Jul. 30, 1999, the content of which is hereby incorporated by reference.

FIELD OF THE INVENTION

The present invention relates to lubrication in mechanical transmissions and in particular to multiple countershaft transmissions wherein means are provided for directly lubricating countershaft bearings and gears within the transmission.

BACKGROUND OF THE INVENTION

Transmission systems are a vital link in the powertrain of any vehicle. The purpose of the transmission system is to employ gears of various sizes to provide an engine with a mechanical advantage over the driving wheels. Maintaining lubrication to the moving parts within the transmission helps to ensure proper operation and long-lasting transmission life. Significant problems often result if moving parts within a transmission are not sufficiently lubricated. Proper lubrication flow characteristics are also important to long-term transmission operation. If inadequate lubricant flows to moving parts, they may prematurely wear, leading to failure.

Additionally, wear of a single moving part within a transmission may produce harmful debris such as metal filings that may interfere with and damage other moving parts within the transmission. While the majority of the debris in the transmission are encountered in the first several thousand miles of operation, activities such as the clutching of teeth can cause such debris to exist over the life of the unit. Moreover, the mere existence of debris may significantly shorten the useful life of a transmission, thereby requiring costly and inconvenient replacement. Finally, the problem of debris formation is especially significant in transmissions that experience high torque loading, such as those used in heavy commercial vehicles.

In the past, transmission wear was reduced by adding multiple counter-rotating shafts with each bearing only a fraction of the transmission load, so that one shaft need not bear the entire load. Transmissions of this type, containing two or more countershafts having radially aligned gears on each of the countershafts that simultaneously engage and support a gear encircling a main shaft of the transmission, are well known, and are generally described in U.S. Pat. Nos. 3,105,395 and 3,237,472. Multiple countershaft transmissions allow the delivery of increasingly high torque and correspondingly higher loads while reducing stress on given gears. However, as torque levels have continually increased, such that transmissions are required to endure increased loads, degradation of the gears and especially of the countershaft bearings has become a problem. In particular, as torque on the countershafts has exceeded 2,000 lb-ft, and even approached 2,200 to 2,400 lb-ft of torque, gear and bearing degradation has become severe enough that transmission life is significantly reduced.

Conventionally, as noted above, multiple countershaft transmissions include a lubricating transmission fluid generally collected in a pan on the lower side of the transmission. In some transmissions, a submerged oil pump moves a portion of the lubricating transmission oil through a flow path to directly or forcibly lubricate countershaft synchronizers to extend the synchronizer life. However, other components within the transmission, and in particular the gears and the countershaft bearings, are generally lubricated by "splash" lubrication within the transmission, whereby oil residing in the oil pan and the rest of the transmission is agitated and splashed within the transmission casing. In known transmissions experiencing torque less than about 2000 lb-ft exerted upon the shaft, such splash lubrication has proven sufficient for extended lifetime. However, as torque levels have increased, the gears and the bearings experience significantly higher stress that is not alleviated through conventional splash lubrication.

Moreover, with increased torque levels, engine lower gears, located adjacent the front of the transmission casing, have increased in size. In general, as gear size has increased, places such as the pockets holding the bearings that support the front of a rotating countershaft become shielded by the gears and receive insufficient splash lubrication. As a result, front countershaft bearings prematurely wear and degrade, thereby limiting the transmission life or increasing the frequency of repair. Moreover, one set of gears may shield other sets of gears, so that some gears may be adequately lubricated while others are not. The shielded gear sets may then pit and degrade, producing harmful debris within the transmission. Accordingly, one way to improve high torque transmissions and to retain gear integrity to extend transmission life is to ensure adequate lubrication to all gears and to all front countershaft bearings.

SUMMARY OF THE INVENTION

A pressure lubrication system for multiple countershaft transmissions is provided wherein a lubrication flow path is provided from an oil pump located within a transmission casing such that oil is forced to flow directly to the front support bearings of each of the multiple countershafts. In another embodiment, a second flow path is provided from the front countershaft bearings parallel to a main shaft of the transmission. The second flow path provides oil directly to a predetermined number of gear sets located along the main shaft. In a preferred embodiment, oil flows through a first tube from the oil pump or from an external oil cooler to an annular ring placed about the outer circumference of the main shaft as it enters the transmission main case. The ring is placed in a groove between a front wall of the transmission main case and a rear face of a clutch housing. The ring is provided with a plurality of apertures along its outer circumference spaced to allow oil to flow directly to front bearings of multiple countershafts placed adjacent the main shaft. A closed ended tube connects to the annular ring, and extends perpendicularly from the annular ring through the front wall of the transmission main case towards the rear of the transmission. The closed ended tube extends substantially parallel to the driven main shaft, and includes spaced orifices that deliver oil directly to a predetermined number of gear sets located axially along the main shaft.

The present invention allows for forced lubrication of wear parts within a transmission that readily degrade within a high torque transmission absent such lubrication. In particular, lubricating the front countershaft bearings increases bearing life while decreasing repair costs. Likewise, directly lubricating the gear sets prevents pitting and excessive wear, especially during the critical break in period.

BRIEF DESCRIPTION OF THE DRAWINGS

The features and advantages of the present invention will be apparent to one of ordinary skill and art from the detailed description of the invention that follows and from the accompanying drawings, wherein.

DETAILED DESCRIPTION OF PREFERRED EMBODIMENTS

Figure 1:
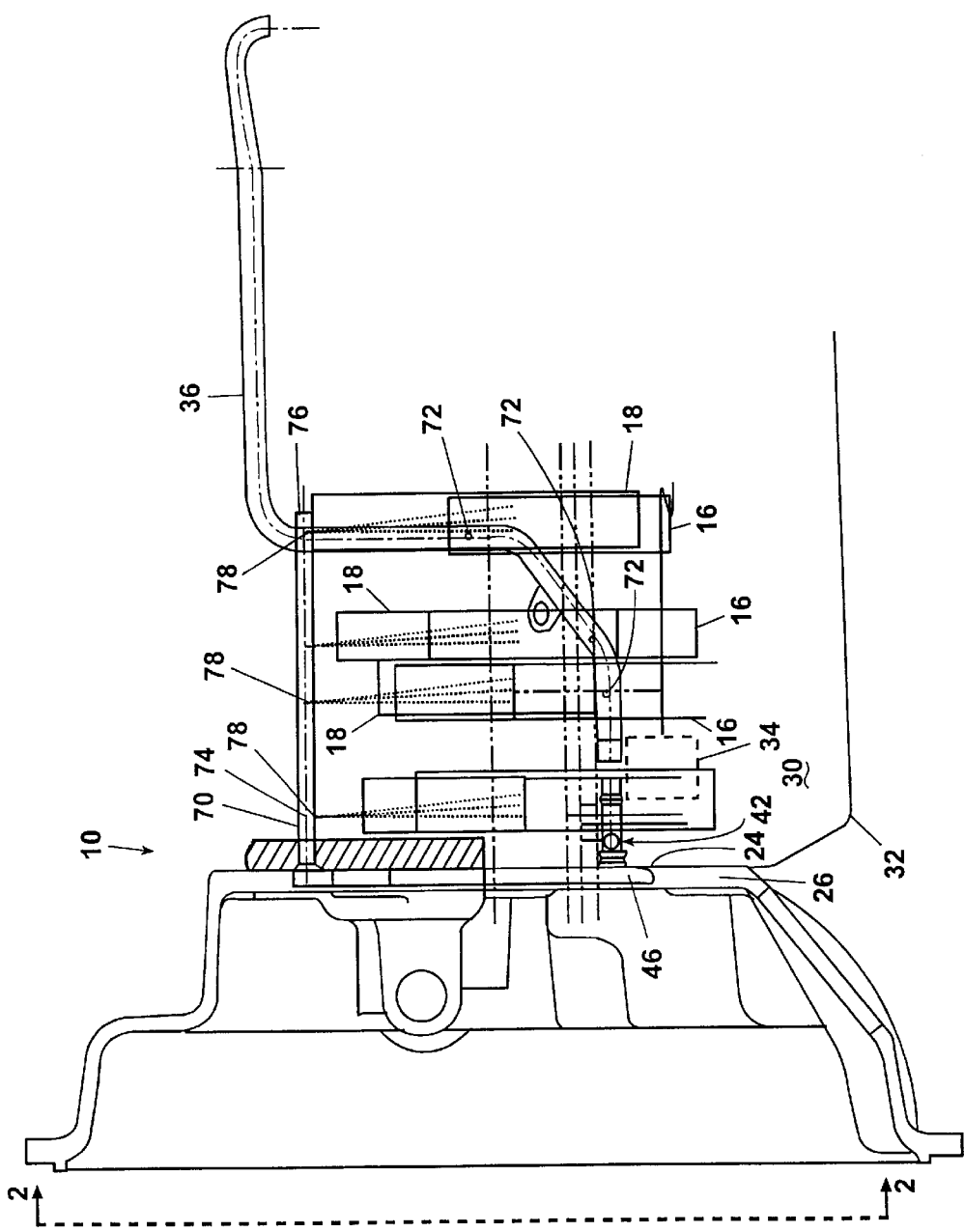
FIG. 1 is a cross-sectional view of a portion of a multiple countershaft transmission including the pressure lubrication system of the present invention.
Figure 2:
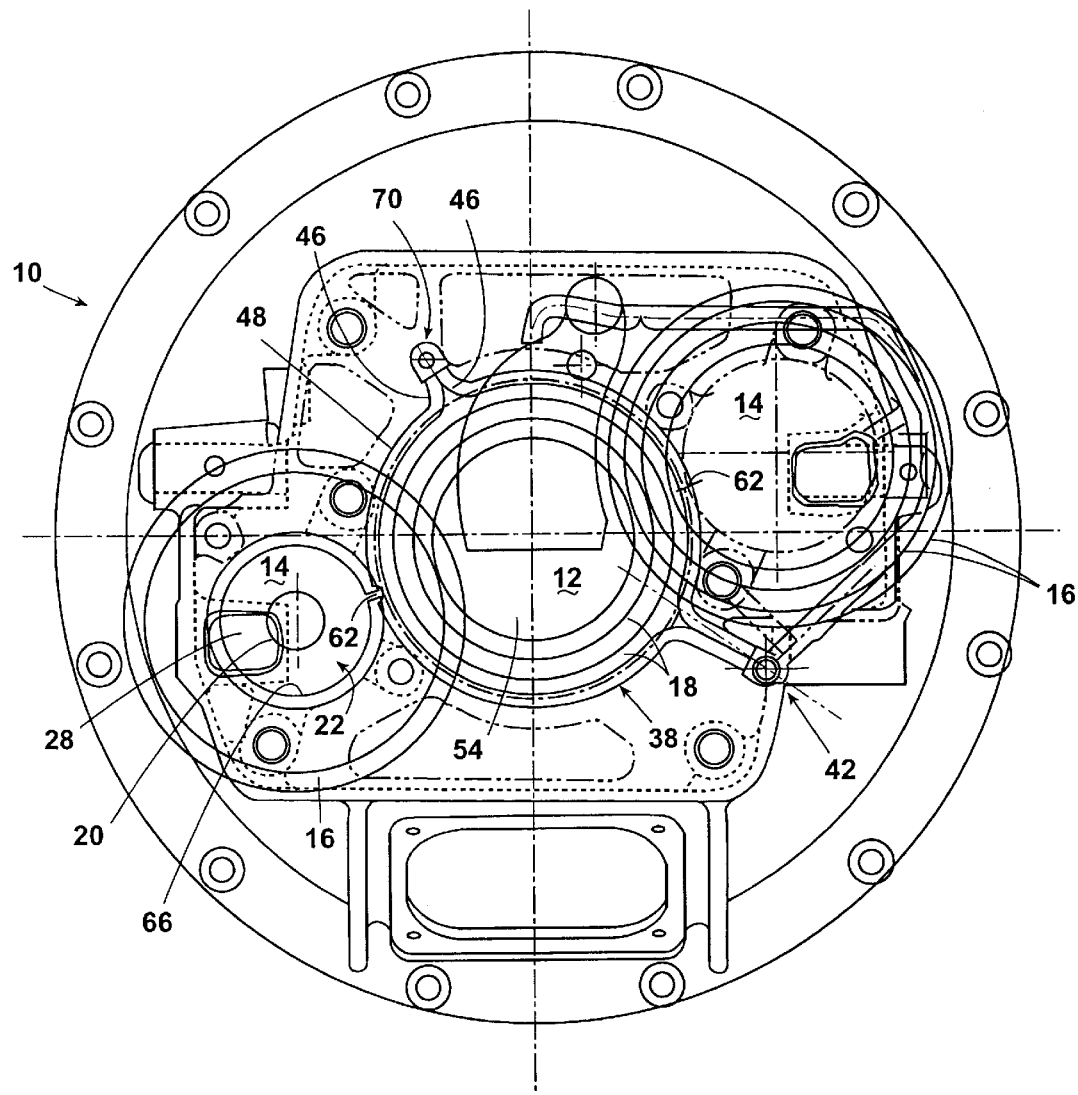
FIG. 2 is a front cross-sectional view of the multiple countershaft transmission taken along line 2—2 of FIG. 1.

A countershaft transmission 10, such as the one shown diagrammatically in FIGS. 1 and 2, generally include a main shaft 12 having two or more similar countershafts 14 arranged at equally spaced intervals about the main shaft 12. The countershafts 14 include similarly placed countershaft gears 16 arranged respectively opposite each other on the countershafts 14 that engage respective main shaft gears 18 placed about the main shaft 12. The main shaft gears 18 are in constant engagement with respective countershaft gears 16. The main shaft 12 is selectively clutchable to one of the main shaft gears 18. In general, several main shaft gears are provided to allow selective clutching between main shaft gears having different gear ratios.

Each countershaft 14 is generally supported at a front end 20 within a pocket 22 machined into a front internal face 24 of a transmission front wall 26. In FIG. 2, two countershafts 14 are shown within respective pockets 22. To minimize friction, the countershafts 14 are supported upon bearings 28 that fit snugly within the pockets 22 while allowing rotation of the countershafts 14 about their axis of rotation.

Each transmission 10 defines a substantially closed system that is filled with a lubricating fluid or oil. The oil is generally collected, due to the effects of gravity, within an oil sump 30 located along the bottom wall 32 of the transmission 10. During normal operation of the transmission 10, the oil collected in the sump is agitated by the movement of the main shaft 12 and the countershafts 14, as well as the gears 16, 18 moving through the oil. Due to the agitation, the oil is generally splashed within the transmission case (not shown) to provide lubrication wherever the oil is deposited. Moreover, the oil within the transmission 10 provides a cooling function to remove heat caused by the frictional contact between the main shaft gears 18 and the countershaft gears 16. Thus, the internal workings of the transmission receive lubrication and cooling in a somewhat random fashion that, to date, has proven sufficient to extend transmission life.

The oil sump 30 usually includes a mechanical oil pump 34 to pump lubricating oil to inaccessible portions of the transmission and to pump the oil to an external cooling apparatus (not shown). In this way, the frictional heat generated within the transmission is removed from the system while remote portions of the transmission 10 within the transmission case also receive proper lubrication. For example, in FIG. 1, a splitter tube 36 provides a direct oil flow path from the oil pump 34 to the splitter gears (not shown) and potentially to countershaft synchronizers (also not shown). The splitter tube 36 is provided because the splashing of the oil within the transmission case may not adequately lubricate the splitter gears and synchronizers, which are located in a remote section of the transmission casing.

As noted above, splash lubrication of the internal workings of a transmission is generally sufficient to provide both lubrication and cooling. However, as the transmission torque levels increase above about 2000 lb-ft, the gears 16, 18 begin to experience higher stress levels that have been found to lead to pitting and excessive wear during both break-in of the transmission 10 and during normal operations. Moreover, as transmissions have increased in size to accommodate higher torque, it has also been found that the front countershaft bearings 28 become shielded by the countershaft gears 16 and are insufficiently splashed by oil to provide adequate lubrication and cooling. As a result, the countershaft bearings 28 in high torque transmissions are prone to failure, requiring a costly repair or replacement of the transmission 10.

Figure 5:
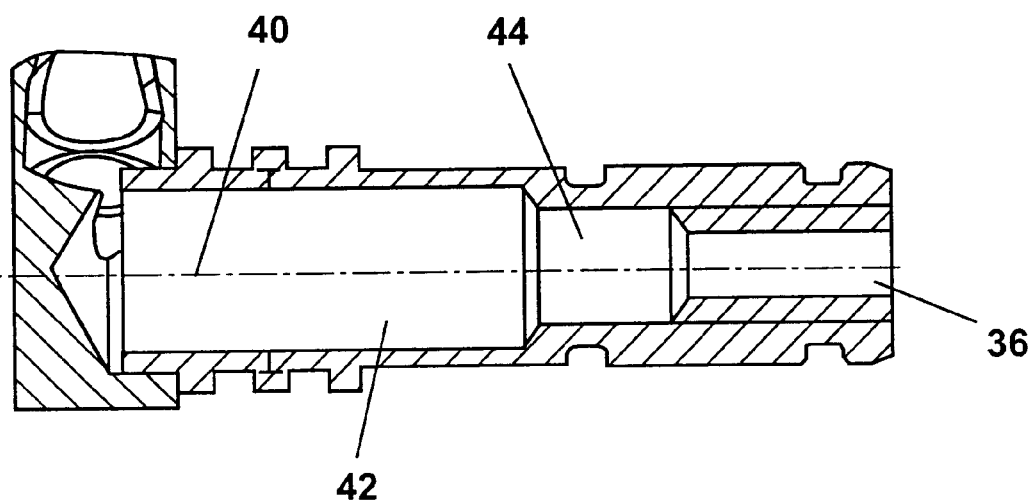
FIG. 5 is a detail view of circle 5 from FIG. 4, showing the metering orifice used to provide oil to the first flow path of the present invention.

According to the present invention, a first flow path 40 is established between the oil pump 34 and the front countershaft bearing pockets 22 to forcibly lubricate the front countershaft bearings 28. The first flow path 40 may include an annular groove machined into the front internal face 24 of the transmission front wall 26, so long as the path terminates at the front bearing pockets 22. In a preferred embodiment, oil is directed, either directly from the oil pump 34 or directly from the external cooling device (not shown) into an inlet plenum 42. As best seen in FIG. 5, when the oil flows into the inlet plenum 42, the flow of oil is divided between a metering orifice 44 and the first flow path 40. The metering orifice 44 is connected to the splitter tube 36 and meters the amount of oil allowed to flow to the splitter tube for forcibly lubricating the splitter gears and/or the synchronizers. By limiting oil flow in one direction, i.e. towards the splitter tube, the balance of the oil flowing into the inlet plenum 42 is forced to flow through the first flow path 40 to the front countershaft bearing pockets.

Figure 3:
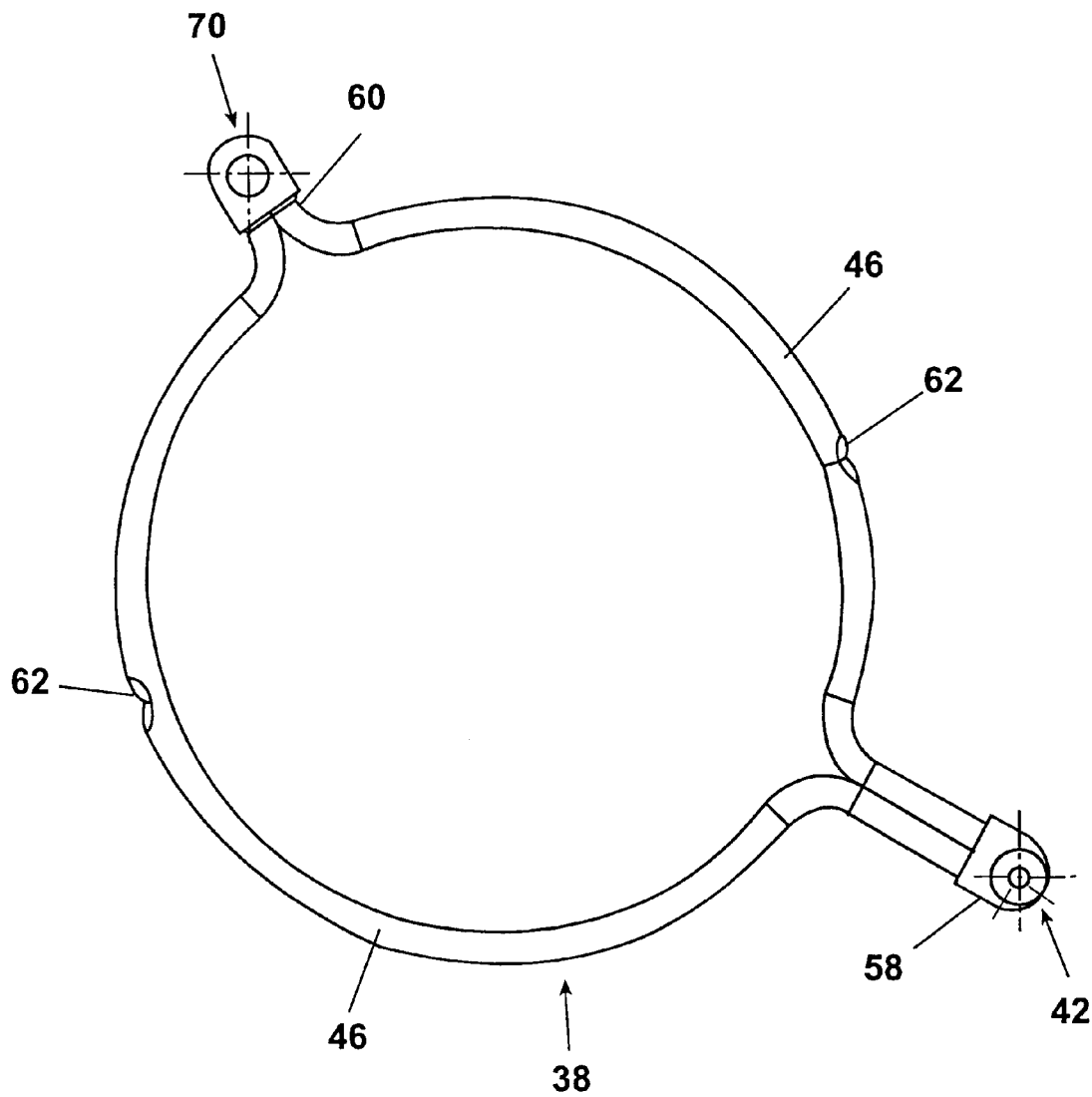
FIG. 3 is a front view of the first lubrication flow path according to the present invention.
Figure 4:
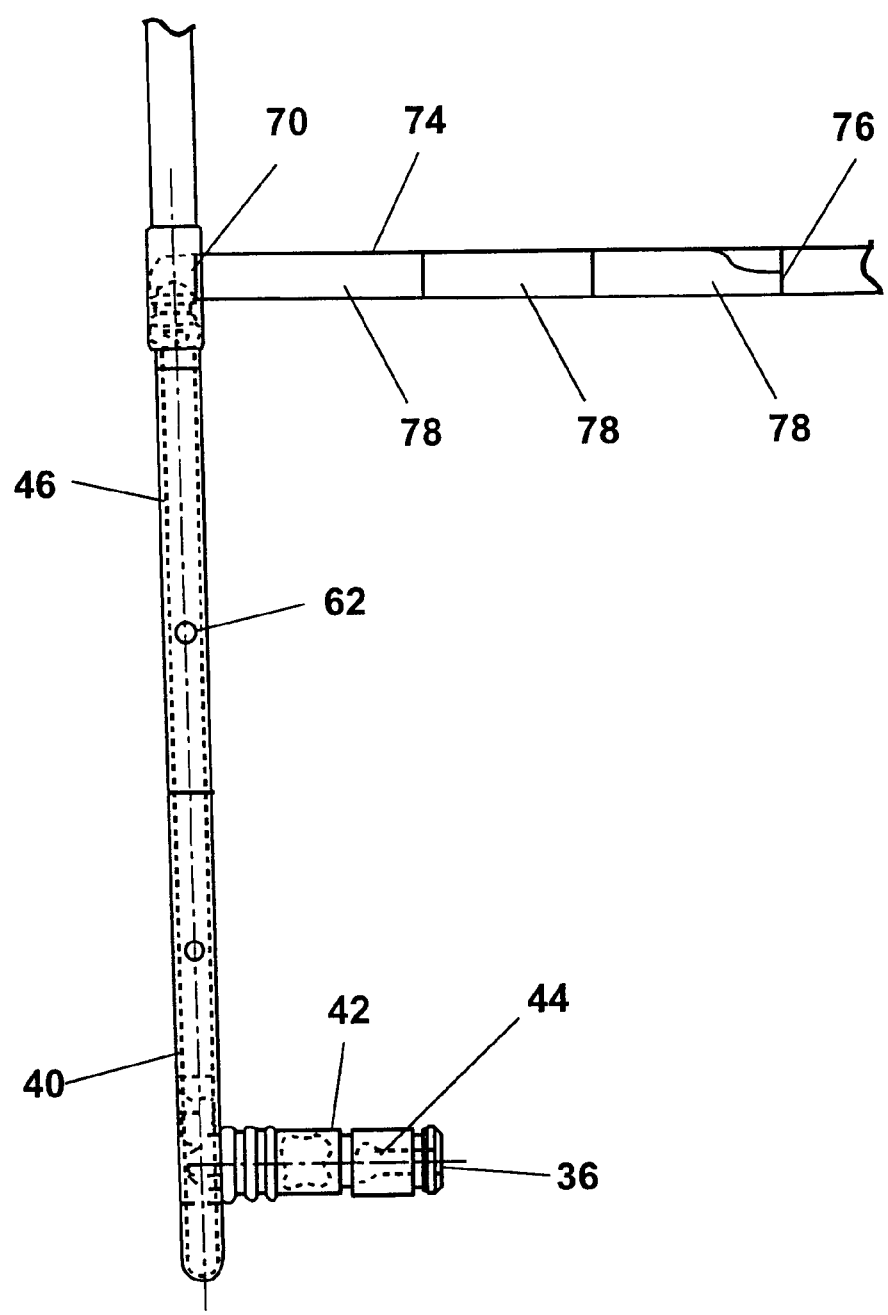
FIG. 4 is a side view of the first and second lubrication flow paths provided according to the present invention

In a most preferred embodiment, best shown in FIGS. 2 and 3, the oil flowing from the inlet plenum 42 along the first flow path 40 enters an annular ring 38. While the annular ring 38 may be of unitary constructions, the oil flow preferably is further divided between two generally semi-circumferential tubes 46 for distribution to the front bearing pockets. Two semi-circumferential tubes 46 are utilized for ease of manufacture, but a single circumferential tube or even multiple tubes may be utilized to construct the generally circular flow path shown in FIGS. 2 and 3. The generally semi-circumferential tubes 46 are preferably placed within a machined, generally circular groove 48 machined in the transmission front wall 26. However, it should be understood that the generally circular groove 48 is not necessary, and if used, may be placed in any convenient location to achieve sufficient access to the front countershaft bearing pockets 22. As best seen in FIG. 3, the generally semi-circumferential tubes 46 are interconnected at first and second ends 58, 60 to form a generally circular shape for fitting into the generally circular groove 48. In the most preferred embodiment, the circular groove 48, and the generally semi-circumferential tubes 46, are sized to fit about the outer circumference of the front portion 54 of the main shaft 12. Therefore, the main shaft 12 passes through a circular opening 56 defined by the combination of the generally circular groove 48 and the generally semi-circumferential tubes 46.

Each of the generally semi-circumferential tubes 46 includes appropriately placed and sized apertures 62 for spraying oil into the front countershaft bearing pockets 22. In practice, the apertures 62 are aligned with corresponding apertures 64 (see FIG. 2) placed along the outer circumference 66 of the front bearing pockets 22. Best results are achieved using semi-circumferential tubes 46 having an outer diameter of between 0.3 and 0.5 inches in diameter, and most preferably having an outer diameter of 0.375 inches. The apertures 62 work best if between 0.080 to 0.100 inches in diameter. In this configuration, oil is delivered to the front countershaft bearing pockets at the rate of about 0.3 to 0.7 gallons per minute (gpm), and most preferably, at the rate of about 0.5 gpm. Of course, after the oil is sprayed upon the front countershaft bearing pockets 22, it then flows back to the oil sump 30.

In some high torque transmissions, it is not sufficient to only provide forcible lubrication to the front countershaft bearing pockets 22. It is also desired to forcibly lubricate both countershaft gears 16 and the main shaft gears 18, especially at the points where the gears 16, 18 mesh. Such lubrication is especially critical during the break-in period of the transmission to reduce pitting and wear of the gear teeth.

Accordingly, in a second embodiment, a second flow path 70, shown in FIGS. 1 and 2, is provided from the oil pump 34 to a point generally above the gears 16, 18. Oil is then continuously sprayed onto a predetermined number of gear sets. In one method, apertures 72 may be located in the splitter tube 36 to spray oil directly onto the countershaft gears. In the most preferred method, the semi-circumferential tubes 46 empty into a tube 74 that extends horizontally above the gears 16, 18 along the length of the transmission 10 generally parallel to the main shaft 12 and the countershafts 14. The tube 74 has a closed end 76 and appropriately placed orifices 78 above each gear set. For example, if four gear sets require forced lubrication, four orifices 78 are located along the length of the tube 74. Preferably, the tube 74 is similar in size and construction to the semi-circumferential tubes 46. Each orifice 72, 78 (depending upon the method used) is between 0.125 and 0.200 inches in diameter, and most preferably, each orifice 72, 78 is 0.145 inches in diameter. In particular, the orifices 72, 78 are sized to deliver a total of between about 0.75 and 1.25 gpm per gear set, and most preferably, 1.0 gpm per gearset. This amount of lubrication delivery has been found to greatly reduce pitting and gear wear in high torque environments.

The present invention therefore provides first and second lubricant flow paths directly to portions of a transmission 10 that suffer significant wear, thereby helping to prevent deterioration and damage. In particular, the front bearing pockets 22 receive sufficient lubrication to extend the life of the bearings, especially in transmissions handling high torque loads. Moreover, the gear sets receive separate direct sprays of lubricating fluid, thereby helping to reduce pitting or degradation over time, and especially during critical break-in periods. The present invention extends the expected useful life of a high-torque transmission, while increasing reliability and decreasing repair costs.

Ordinarily, small diameter apertures and orifices as used in the present invention would not be practical because debris generated within the transmission would tend to block the apertures. However, the present invention is designed for use with the "Oil Filtration System And Adapter" described in Applicants co-pending application, set forth above under "Related Applications", which operates to remove the majority of debris from the lubricant. Moreover, it is well known that the majority of gear degradation, and consequently, the majority of debris formation, occurs within the transmission break-in period. By providing direct lubrication to the gears from the beginning of the transmission lifetime, gear pitting and degradation is reduced, with a corresponding reduction in debris. Therefore, even without the Oil Filtration System, the apertures and orifices of the present invention should not become blocked because debris formation is prevented by adequate lubrication.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications will come within the teachings of this invention and that such modifications are within its spirit and the scope as defined by the claims.

What is claimed is:

1. In a transmission having at least one main shaft and at least one countershaft enclosed by a transmission housing, wherein the at least one countershaft is supported on a first end by a countershaft bearing, and wherein the transmission housing further encloses an oil sump, a transmission lubrication system, comprising:
   a first forced lubricant flow path directly interconnecting the oil sump and the countershaft bearing.

2. The transmission lubrication system of claim 1, further comprising a second forced lubricant flow path for providing lubricant from the oil sump to at least one interface between the at least one main shaft and the at least one countershaft.

3. The transmission lubrication system of claim 2, wherein said first forced lubricant flow path comprises a first tube interconnecting the oil sump and the countershaft bearing.

4. The transmission lubrication system of claim 3, wherein the first tube includes an annular portion for directing lubricant flow around the main shaft, wherein said annular portion further includes an aperture on its outer circumference located for spraying lubricant directly onto the countershaft bearing.

5. The transmission lubrication system of claim 3, wherein said second forced lubricant flow path comprises a second tube connected to said first tube, said second tube extending parallel to the main shaft and delivering lubricant directly to at least one interface between the at least one main shaft and the at least one countershaft.

6. The transmission lubrication system of claim 5, wherein said second tube includes a closed end and a plurality of orifices for delivering lubricant directly to said at least one interface between the at least one main shaft and the at least one countershaft.

7. The transmission lubrication system of claim 6, wherein said first and second tubes have an outer diameter of between approximately 0.3 and 0.5 inches.

8. The transmission lubrication system of claim 7, where said first and second tubes have an outer diameter of approximately 0.375 inches.

9. The transmission lubrication system of claim 7, wherein said orifices have a diameter of between approximately 0.125 and 0.200 inches.

10. The transmission lubrication system of claim 9, wherein said orifices have a diameter of approximately 0.145 inches.

11. The transmission lubrication system of claim 10, wherein said first flow path delivers about 0.5 gpm of lubricant to the countershaft bearing, and said second flow path delivers about 1.0 gpm of lubricant to said at least one interface between the at least one main shaft and the at least one countershaft.

12. A lubrication system for a transmission, comprising:

a main shaft;

at least two countershafts having an axis parallel to the axis of said main shaft, each said countershaft supported on a front end by front countershaft bearings;

a plurality of countershaft gear sets on said countershafts, said gear sets continuously engaged with a corresponding plurality of main gear sets on said main shaft;

an oil sump containing an available quantity of lubricant; and a first flow path from said available quantity of lubricant directly to said front countershaft bearings.

13. The lubrication system of claim 12, further comprising a second flow path between said first flow path and said gear sets.

14. The lubrication system of claim 13, wherein said first flow path comprises a first tube interconnecting said oil sump and said front countershaft bearing.

15. The lubrication system of claim 14, wherein said first tube defines an annular portion about the outer circumference of a front portion of said main shaft adjacent said front countershaft bearings, wherein said annular portion further includes at least two apertures spaced on its outer circumference for spraying lubricant directly onto said front countershaft bearings.

16. The lubrication system of claim 15, wherein said second forced lubricant flow path comprises a second tube connected to said annular portion, said second tube extending parallel to said main shaft and delivering lubricant directly to at least one interface between said countershaft and main shaft gears.

17. The lubrication system of claim 16, wherein said second tube includes a closed end and a plurality of orifices for delivering lubricant directly to said at least one interface between said countershaft and main shaft gears.

18. The lubrication system of claim 12, further including a second flow path comprising a splitter tube having a plurality of orifices spaced to provide lubricant to at least one interface between said countershaft and said mainshaft gears.

19. A lubrication system for a transmission, comprising:

a main shaft;

at least two countershafts having an axis parallel to the axis of said main shaft, each said countershaft supported on a front end by front countershaft bearings;

a plurality of countershaft gear sets on said countershafts, said gear sets continuously engaged with a corresponding plurality of main gear sets on said main shaft;

an oil sump containing an available quantity of lubricant; and a gear lubricating flow path from said available quantity of lubricant directly to at least one interface between said countershaft and said mainshaft gears.

20. The lubrication system of claim 19, wherein said gear lubricating flow path comprises a splitter tube having a plurality of orifices spaced to provide lubricant to said at least one interface.

21. The lubrication system of claim 20, further including a bearing lubricating flow path from said available quantity of lubricant directly to said front countershaft bearings.

22. The lubrication system of claim 21, wherein said gear lubricating flow path comprises a closed ended tube disposed horizontally above said main shaft having a plurality of orifices for delivering lubricant directly to said at least one interface.

* * * * *